Aug. 30, 1927.
P. KUCERA
1,640,944
METHOD AND APPARATUS FOR REGULATING GLASS MACHINES
Filed March 3, 1922　　3 Sheets-Sheet 1
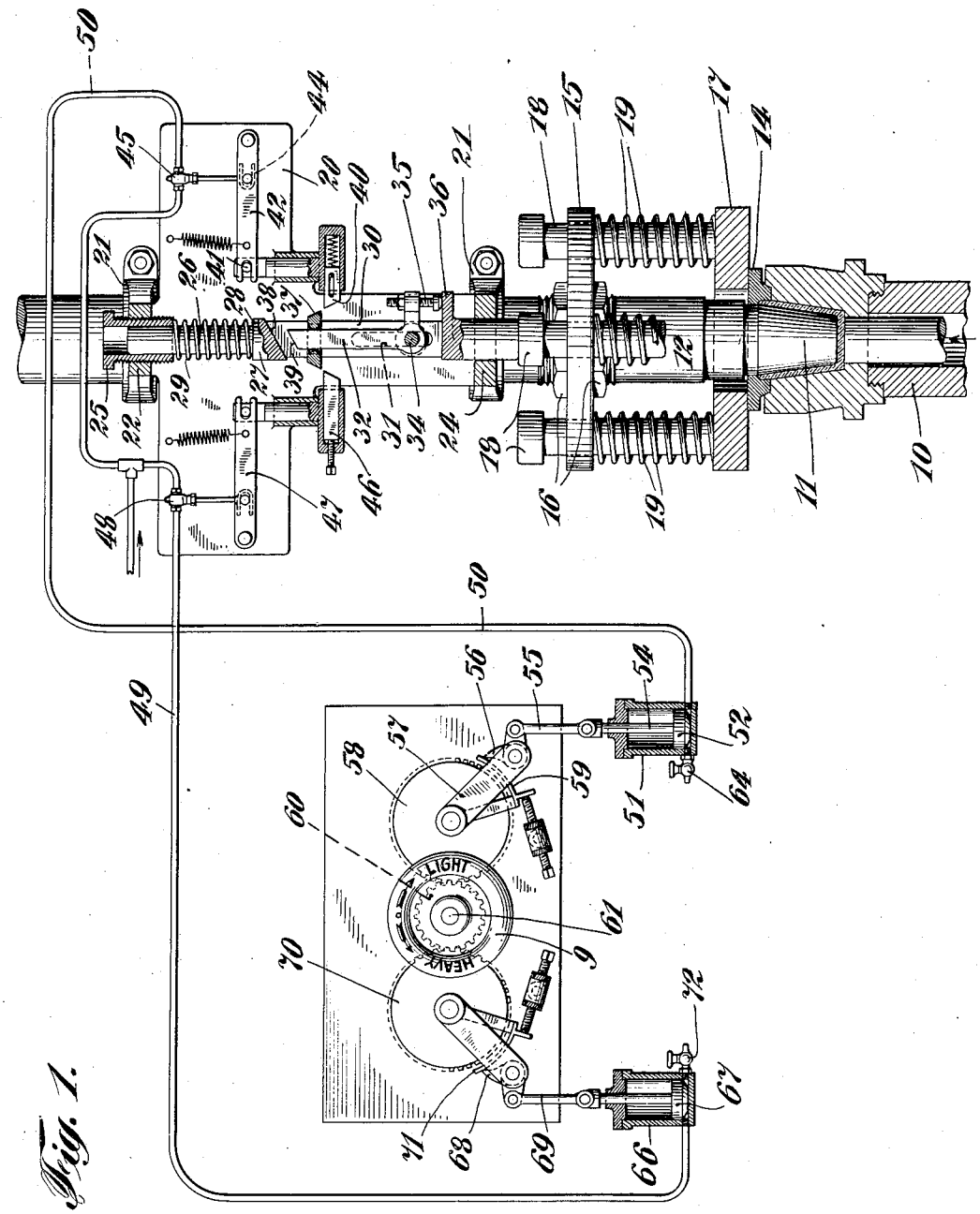
Inventor
Peter Kucera
By George Ramsey
his Attorney Aug. 30, 1927.  
P. KUCERA  
1,640,944  
METHOD AND APPARATUS FOR REGULATING GLASS MACHINES  
Filed March 3, 1922   3 Sheets-Sheet 2
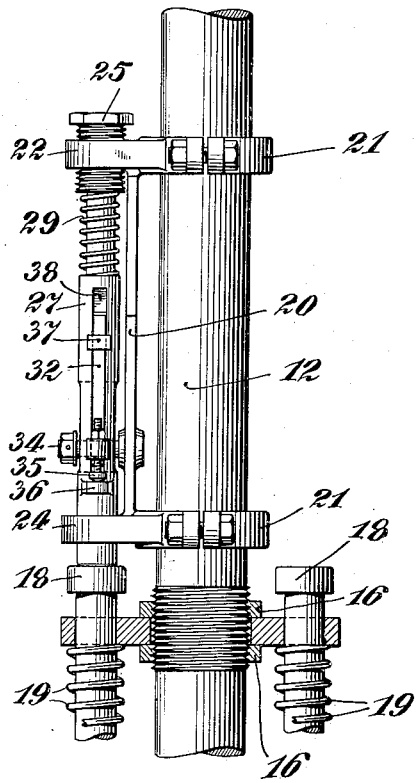
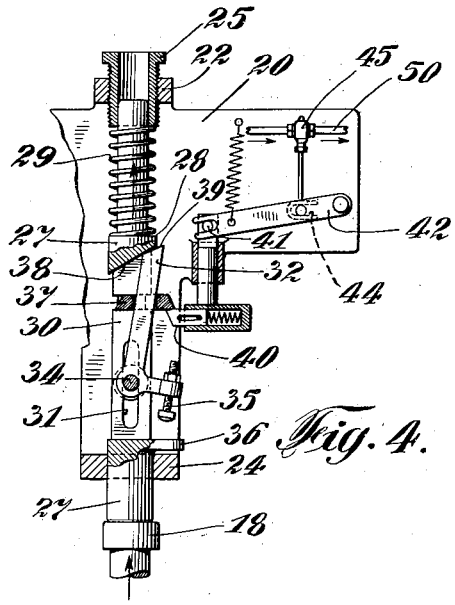
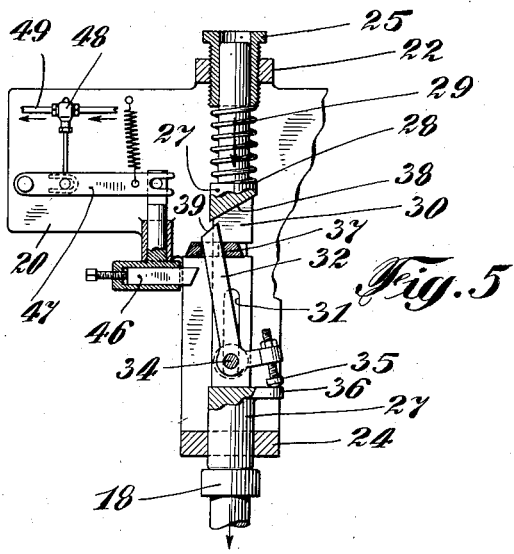
Inventor  
Peter Kucera  
By George Ramsey  
his Attorney

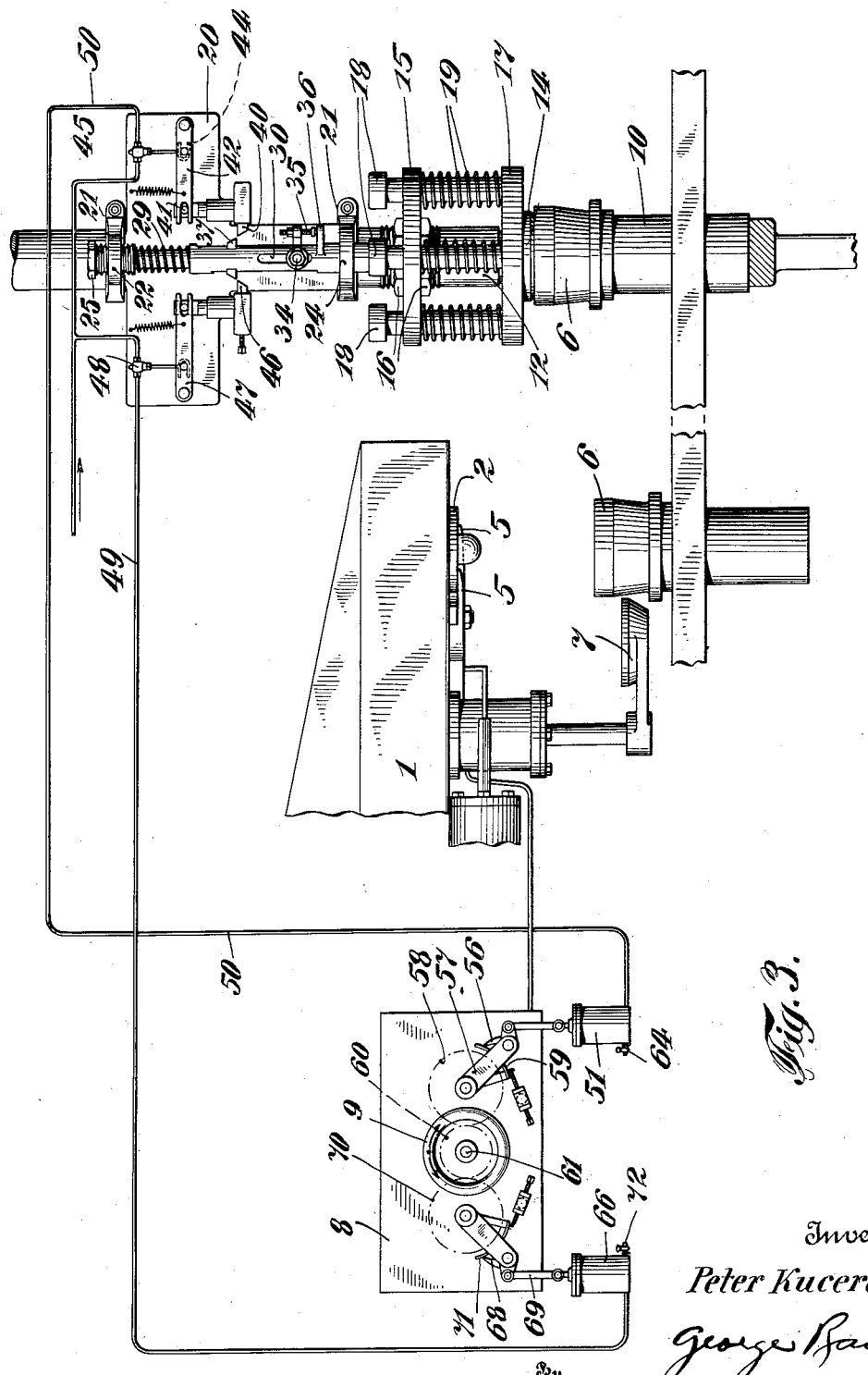

Patented Aug. 30, 1927.

1,640,944

UNITED STATES PATENT OFFICE.

PETER KUCERA, OF CONNELLSVILLE, PENNSYLVANIA, ASSIGNOR TO CAPSTAN GLASS COMPANY, OF CONNELLSVILLE, PENNSYLVANIA, A CORPORATION OF DELAWARE.

METHOD AND APPARATUS FOR REGULATING GLASS MACHINES.

Application filed March 3, 1922. Serial No. 540,790.

The present invention relates broadly to the glass industry and more specially to a method and apparatus for regulating a mold charge from a feeding mechanism.

Glass feeding devices, heretofore in the art adapted to feed mold charges to press molds or blank molds, have necessarily been constructed to deliver substantially a predetermined amount of glass for each charge. In view of the fact that the amount of glass delivered in a given time is dependent upon the viscoscity of the glass and other conditions which vary, it is necessary that such glass feeding devices be provided with mechanisms whereby the amount of glass delivered in each charge may be controlled. It has been the custom heretofore in the art for an operator to stand by each machine and while observing the operation of the machine, to manually control the feeder according to the charges delivered to the machine, and the operator is unable to make any accurate observation of the glass delivered until the finished ware leaves the machine. In the ordinary presses this does not occur until several stations from the feeding station on the press have been passed. Therefore if the glass is too hot or too cold, the mold charge will accordingly be either too great or not enough but the operator will not be apprised of this fact until the charge is pressed or blown so that several mold charges are in the machine before an imperfect piece of ware leaves the finishing station of the machine. When this happens it is a certainty that all of the charges at that time in the molds are imperfect charges. The operator makes his adjustment as soon as he discovers the error but if the adjustment is not exactly the right one he is not aware of this fact until the adjusted charge has been pressed or blown and a number more of the imperfect charges are in the machine. In view of these facts it will appear that an operator is sure to lose a number of pieces of ware before corrective adjustments are made so that acceptable ware can be manufactured. The operator does not attempt to overcome very small changes but merely attempts to keep the charges within such limits as permit the making of completed articles which will pass without being classed as imperfect ware.

The present invention overcomes the difficulties of the known art by providing a purely automatic arrangement for maintaining the charges within limits much closer than can be maintained by hand regulation. The present invention broadly comprises constructions whereby the change in volume of a charge delivered if over or under a predetermined limit operates indicators or actuates mechanisms which correct the variation and thus maintain the volume substantially constant. In one embodiment of the present invention the indicators or the actuating mechanisms are controlled by the thickness of glass between the presser plunger and the bottom of the mold. If this thickness is less than a predetermined limit the plunger telescopes further into the mold than normally and the additional telescopic movement actuates an indicator or a motor mechanism which operates controls to slightly increase the next charge. In view of the fact that the pressing operation usually takes place at the station adjacent to where the glass is fed, the effect of the regulation immediately appears in the next charge. If the next charge is exactly right no further regulation occurs. If the succeeding charge, however for example, is still under weight the plunger again telescopes beyond the predetermined limits and the motor mechanism is again actuated to operate the controls to still further increase the volume of the next charge, and so on until the charge is exactly the right amount. If temperatures in the furnace change and the glass becomes hot so that oversized charges are fed to the molds, the plunger then does not telescope into the mold to the predetermined limit, and devices are provided whereby this lack of telescopic movement actuates the motor mechanism to operate the controls for the feeder to decrease the amount of glass being fed.

It therefore will be seen that the present invention provides automatically operated mechanisms which increase the charge if the charge is insufficient and decrease the charge if the charge is too large. This is done by controls which are actuated by the charge in the mold at the machine station adjacent to the mold charging station. This provides for correcting any errors before a large number of charges are in the machine, and in view of the fact that the mechanism may be completely automatic, the limits may be much more closely set than is possible with hand operation.

Having generally described the invention it may be stated that the objects are as follows: The principal object of the present invention is the method and apparatus for controlling glass feeders by determining the operation of the controls through volumetric measurement of the charges deposited in the molds.

Another object of the present invention is the method and apparatus for controlling the volume of glass charges within predetermined limits by automatically reducing the volume of a succeeding charge when the volume of the pressed charge is too great, and automatically increasing the volume of a succeeding charge when the volume of a pressed charge is too small.

A still further object of the present invention is mechanism for automatically operating charge forming controls for automatic glass machines whereby the volume of a succeeding charge is controlled by the volume of a preceding charge that is being manufactured into a finished article.

A still further object of the present invention is the method of operating controls for determining the volume of charges from glass feeders, which method comprises measuring the volume of a pressed charge during the pressing operation, and increasing or decreasing a succeeding charge according to the indication as to whether the pressed charge is over or under a predetermined volume.

A still further and more specific object of the present invention is mechanism for automatically operating controls which determine the volume of glass charges fed from glass feeders which mechanism comprises means operated by the relation of a presser plunger and a portion of the mold whereby a succeeding charge is increased in volume if the plunger extends into the mold beyond a predetermined point and whereby a succeeding charge is decreased in volume if the plunger is not permitted to enter the mold a predetermined distance.

Other and more specific objects of the present invention will in part be obvious and will in part be pointed out hereinafter in the specification following by reference to the accompanying drawings forming a part of this application.

Realizing that the present invention may be embodied in constructions other than those specifically shown and described it is desired that the disclosure herewith shall be considered as illustrative and not in the limiting sense.

Referring now to the drawings wherein like parts are represented by like characters throughout the several figures thereof.

Figure 1 is a diagrammatic illustration of one embodiment of the present invention illustrating the parts in position when a charge of exactly the right volume is being pressed.

Figure 2 is a detail elevational view of a part of the actuating mechanism shown in Figure 1.

Figure 3 is a diagrammatic view similar to Figure 1 with the addition of parts illustrating diagrammatically portions of a glass feeder.

Figure 4 is a detail view illustrating the position of the operating mechanism after pressing an over-sized charge whereby the control mechanisms will be operated to make the next succeeding charge of lesser volume.

Figure 5 illustrates positions of the actuating mechanism when an under sized charge is being pressed and showing the parts in position to operate the controls so that the succeeding charge will be of greater volume.

The embodiment of the invention illustrated diagrammatically comprises an attachment adapted for use in connection with devices which are well known in the art and for the purposes of clearness such well known devices are not illustrated in detail.

It is customary in the art to provide glass feeders for feeding glass from suitable furnaces and such glass feeders may comprise a trough or boot 1 (Fig. 3) provided with a bushing 2 through which glass charges are adapted to be delivered. Such charges may be severed by suitable shears 5 and allowed to drop directly into a press mold 6. The oncoming glass may be supported during mold change by a suitable pressure cup 7. The size or volume of the charges is determined by timing mechanism 8 which controls the time period. This timing mechanism is provided with a hand wheel 9 which when turned in one direction, for example, clockwise, causes the charges to be less in weight and volume, whereas the turning of this wheel 9 counter-clockwise causes the charges to be increased in weight and volume. All of this mechanism is old in the art and is referred to merely as illustrative of the type of glass feeder with which the present invention is adapted for use.

This feeder is well known in the commercial art as the "Tucker and Reeves feeder," and one such feeder is in operation in the plant of the Capstan Glass Company at Connellsville, Pennsylvania. A description of the feeder may be found in the British patent to Tucker and Reeves, No. 109,782 dated September 4, 1919.

The molds illustrated are of the press mold type and may be mounted upon a suitable revolving press table as is very well known in the art. In such press table constructions it is customary for the pressing operation to take place one station removed from the feeding station. The pressing may be accomplished in various ways such as by lifting the mold 6 upwardly, by a ram 10, against a suitable forming plunger 11. This forming plunger is duly mounted on a plunger column or staff 12. Where packers ware or the like is being manufactured it is customary to provide a ring mold 14 which forms the upper edge or finish of the ware. This ring mold cooperates with the press mold and with the plunger which passes through the ring mold to form the interior of the tumbler or jar. The ring mold may be supported in various ways but commonly is supported on the plunger staff 12 by means of the yoke 15 held in position by clamp nuts 16. In order that the ring mold may be tightly and at the same time yieldingly held in position against the press mold 6 the ring mold carrier 17 is mounted upon guide bolts 18 which are slidable through the yoke 15. These bolts 18 carry coiled springs 19 normally separating the yoke and the carrier. The mechanism of the press which has been described is also very old in the art and again is referred to merely as illustrative of construction with which the present invention is adapted for use.

Coming now to a description of one embodiment of the invention, a frame 20 is mounted upon the plunger staff 12 by clamp rings 21 or other suitable mechanism and the frame 20 carries a pair of guide rings 22 and 24. The upper guide ring 22 carries an adjustable sleeve 25 in which a reduced portion 26 of a control rod 27 is slidable. The lower guide ring 24 guides the lower end of the control rod 27. This rod is formed with a shoulder 28 adjacent the reduced portion 26 and a coil spring 29 abuts against the shoulder and the end of the adjustable sleeve, thereby normally forcing the rod 27 in a downward direction. The rod is provided with a slot 30 and also with short slots 31 extending through the rod at right angles to the main slot 30. An actuator lever 32 is mounted in the slot 30 upon a pivot bolt 34 which extends through the short slots 31 and is secured to the frame 20. The actuator lever is in the form of a bell crank and the short arm thereof is provided with an adjustable stud 35 which is adapted to contact with a projection 36 on the control rod 27. The long arm of the actuator lever extends upwardly within the slot 30 and extends through an opening in a cross bar 37 which is mounted for transverse sliding movement within the rod 27, and vertical sliding movement on the long arm of the actuator lever, the cross bar 37 moving vertically with rod 27. The upper end of the slot 30 is inclined as at 38 and under certain conditions is adapted to contact with an inclined end 39 on the actuator lever 32. A spring pressed latch 40 is mounted adjacent the path of the cross bar 37 and is connected on its upper end by a pin and slot joint 41 with a lever 42 which is also connected by a pin and slot connection 44 with a valve 45. An adjustable latch 46 on the opposite side of the plunger 27 is similarly connected through a lever 47 to a valve 48. The valves 45 and 48 are connected with a fluid pressure line 49 which may contain compressed air or other suitable fluid so that when a valve is open the fluid may flow through the valve. The valve 45 controls a pipe line 50 which leads to a cylinder 51 and beneath a piston 52. The piston is connected through a piston rod 54 and link 55 with a dog 56 on an arm 57 mounted for arcuate movement around a cog wheel 58. An adjustable shield 59 controls the effective length of the feeding of movement of the dog 56 so that the dog may be regulated to engage the teeth of cog wheel 58 sooner or later thereby feeding the cog wheel a greater or lesser number of teeth for each actuation of the piston. The cog wheel 58 meshes directly with a cog wheel 60 mounted on a control shaft 61 back of a hand wheel 9. The cylinder 51 may be provided with a vent valve 64 whereby the escape of fluid pressure from beneath the piston may be regulated, if desired, after the control valve has been operated. The control valve 48 is similarly connected with a cylinder 66 which carries a piston 67 that is connected with a dog 68 through a link 69 and which dog is adapted to engage a cog wheel 70 and is under control of a feeding shield 71. The cog wheels 70 and 58 are arranged to be driven in opposite directions by the dogs 56 and 68 so that when the valve 48 opens to actuate the piston 67 the control shaft 61 is turned in the direction opposite to the direction of the movement given when the control valve 45 operates. The cylinder 66 may also be provided with a vent valve 72.

When the mold is lowered away from the plunger and the parts are in normal position the inclined end 39 on the actuating lever 32 is in engagement with the incline 38 on the upper end of the slot 30 in the rod 27 and the cross bar 37 is cammed to the right. When the mold 6 is raised for pressing a charge therein, the mold engages the ring mold 14 thereby raising the ring mold carrier 17 and compressing the springs 19, before the plunger begins to exert much pressure on the glass charge. The upward movement of the guide bolts 18 through the yoke 15 brings the head of one of the guide bolts into contact with the lower end of the rod 27. As the forming plunger 11 telescopes into the mold to press the glass the guide bolts 18 continue to move upwardly relatively to the frame 20 carried by the plunger. After the rod 27 has contacted with a guide bolt 18 a further upward movement of the bolt 18 carries the rod 27 upwardly relatively to the actuating lever 32 since the pivot bolt 34 for the actuator lever 32 is mounted on the frame 20. If the amount of glass in the mold is exactly the right amount the head of the adjustable stop 35 on the actuating lever 32 will strike the projection 36 on the rod 27 and swing the cross bar 37 to the central position shown in Figure 1. When the mold drops, the rod 27 follows the downward movement of the bolts 18 and since the cross bar 37 is in the mid position it will pass between the latches 40 and 46 without contact with either latch and no actuation of the adjustment control mechanism takes place.

Prior to the projection 36 contacting with the lower guide ring 24, the inclined end 39 on the actuating lever 32 is contacted with the incline 38 so that the cross bar 37 has again been moved toward the right.

Assuming that the charge of glass in the mold 6 is excessive and therefore the mold is prevented from rising to the normal height, the diminished upward movement of the mold correspondingly diminishes the upper travel of the guide bolts 18 and correspondingly diminishes the upward movement of the control rod 27 so that the stop 35 does not strike the projection 36 and consequently the cross bar 37 is not restored to central position. When the mold drops, the plunger rod 27 (Fig. 4) follows the guide bolt 18 downwardly and the cross bar 37 contacts with the upper surface of the latch 40 thereby carrying the latch down with the cross bar and opening the valve 45 which admits fluid pressure to the cylinder 51 and raises the piston 52 which through connected parts causes the dog 56 to engage the cog wheel 58 and turn the cog wheel and the control shaft in a clockwise direction. The piston 52 is returned to its initial position by any suitable means such as by gravity. This operation is repeated with each charge pressed until the charge is increased so that the right amount of glass is deposited in the mold and at which time the cross bar 37 will be moved to intermediate or central position. No further adjustment will now take place.

Assuming that the charge being pressed is too small then (Fig. 5) the mold will rise higher than normal and the plunger 11 will telescope farther into the mold than it should. Under these conditions the head of the guide bolt 18 will raise the control rod 27 sufficiently to cause the stop 35 to contact with the projection 36 and swing the cross bar 37 to the position indicated in Figure 5. When the mold now drops the spring 29 will drive the control rod 27 downwardly as before but the cross bar 37 will now engage the adjustable latch 46 and through the connected parts will open the valve 48 as indicated in Figure 5. This admits pressure beneath the piston 67 which through connected parts operates to cause the dog 68 to turn the wheel 70 and thereby turn the control shaft 61 in a counter-clockwise direction, consequently operating to increase the amount of glass in the next succeeding charges. The operation continues until the charges are exactly the right size when the cross bar 37 is again brought to neutral or central position, and further adjustment stops until the charges again are slightly out of true volume.

From the foregoing description of one embodiment of the present invention it will appear that very close limits may be set between which the control mechanisms will operate and it will be noted that these control mechanisms operate immediately after the charge has been dropped so that a very close automatical regulation is maintained with this apparatus. Assuming other conditions to be normal a press and feeder equipped with this invention will deliver an exceedingly high percentage of proper sized finished glassware.

The present invention has to do primarily with maintaining the correct volume of glass being fed and not with the subsequent treatment of the correct charges of substantially constant volume therefore while the present invention has been disclosed in connection with merely a pressing device it will appear that the invention is equally applicable to machines wherein a neck mold or parison mold is utilized to form a portion of the ware and then subsequent operations such as blowing etc. may be carried out.

It will be noted that where the charge is insufficient the cross bar 37 is positioned to the right (Fig. 4); where the charge is exactly right this cross bar is central (Fig. 1); and where the charge is too large the cross bar is positioned to the left (Fig. 5). The size of the charge is therefore clearly shown by the relation of this cross bar to the rod 27. This fact forms the basis for method of using this mechanism as an indicator and operating the control by hand. In such case the motor mechanism, valves, etc., may be dispensed with and the indicator alone relied upon to show how the control shaft is to turn manually. Such an arrangement reduces the skill required by the operator, as he merely follows the indicator instead of being required to judge the finished ware, and also gives warning of any required adjustment before a large number of mold charges are in the machine. While this method of indicating is practical the automatic control is preferable because it eliminates the human element and renders the machine self-contained.

What I claim is:

1. The combination of a glass feeding mechanism adapted to feed mold charges to suitable molds, control mechanism for said feeder, molds for receiving the charges, means for pressing the charges in the molds, and devices operated during the pressing operation to operate the said control mechanism only when the charge pressed varies fom a predetermined standard.

2. The combination of mechanism for feeding glass mold charges to suitable molds, controls for said mechanism whereby the volume of charges may be controlled, molds for receiving the charges, pressing mechanism adapted to telescope with said molds to press a charge therein, means controlled by the degree of the telescopic movement to operate said controls to change the volume of a series of consecutive charges in response to the variation of the telescopic movement from a predetermined standard of movement.

3. The combination of a feeder for feeding glass mold charges to suitable molds, a control mechanism for controlling the volume of said charges, molds for receiving said charges, pressing mechanism adapted to telescope with said molds to press a charge in a mold, yielding means adapted to yield during the pressing operation, motor mechanism operatively connected with the control mechanism, said motor mechanism being adapted to be actuated in response to said yielding means when the charge in the mold varies from a predetermined standard.

4. The combination of a feeder for feeding glass mold charges to suitable molds, a control mechanism for controlling the volume of said charges, molds for receiving said charges, pressing mechanism adapted to telescope with said molds to press a charge in a mold, yielding means adapted to yield during the pressing operation, said means comprising a control rod operatively connected with the pressing mechanism and the molds, motor mechanism operatively connected with the control mechanism, said motor mechanism being adapted to be actuated in response to said yielding means when the charge in the mold varies from a predetermined standard.

5. The combination of a glass feeder adapted to feed mold charges to suitable molds, a control for said glass feeder whereby said charges may be varied in volume, molds into which said charges are adapted to be fed, pressing mechanism for pressing the charges fed to the molds by telescoping with the molds, means operated by said telescopic movement, motor devices for operating said control, and mechanism operatively connecting said means and said devices whereby said means is effective to operate said motor devices to control succeeding charges from the feeder when a pressed charge varies from a predetermined standard.

6. The combination of a glass feeder adapted to feed mold charges to suitable molds, a control for said glass feeder whereby said charges may be varied in volume, molds into which said charges are adapted to be fed, pressing mechanism for pressing the charges fed to the molds by telescoping with the molds, means operated by said telescopic movement, motor devices for operating said control, and automatic mechanism operatively connecting said means and said devices whereby said means is automatically effective to operate said motor devices to control succeeding charges from the feeder when a pressed charge varies from a predetermined standard.

7. The combination of a glass feeder for feeding mold charges to suitable molds, control mechanism for controlling the volume of glass in each charge, molds to receive the charges, means to press the charge in the mold, motor mechanism for actuating the control, means to operate the motor to change the control to increase succeeding charges when the pressed charge is too small and to decrease succeeding charges when the pressed charge is too large.

8. The combination of an automatic glass feeder adapted to feed a series of mold charges to suitable molds; and an automatic regulator for said feeder, said regulator comprising mechanism for pressing a charge fed; and means for automatically controlling each of a series of consecutive charges according to the variation of the pressed charge from a standard charge.

9. The combination of a feeder for feeding charges to suitable molds, a control for said feeder for varying the volume of the charges fed, molds for receiving the charges, a plunger for pressing the charges in the molds, a rod adapted to be reciprocated when the plunger enters the mold, a cross bar carried by said rod, motor mechanism for operating said control, devices adjacent said cross bar for operating said motor and means for positioning said cross bar to cause said cross bar when the plunger leaves the mold to operate said motor providing the pressed charge varies from a standard charge whereby the control is actuated to increase succeeding charges if the pressed charge is too light and decrease succeeding charges if the pressed charge is too heavy.

10. The method of controlling the feeding of glass charges to molds, which method comprises measuring the volume of a charge fed during a forming operation on the charge, and then automatically regulating the volume of a series of consecutive charges in response to the variation of the measured charge from a predetermined limit.

11. In combination; a glass feeder for feeding mold charges to suitable molds, said feeder comprising adjustable mechanism to regulate the size of charges fed; molds to receive the charges; means to press the charges in the molds; motor mechanism for adjusting the adjustable mechanism to increase the size of the charges fed; independent motor mechanism for adjusting the adjustable mechanism to decrease the size of the charges fed; means to actuate said first motor mechanism when the pressed charge is too small and to actuate said second motor mechanism when the pressed charge is too large.

12. In combination; a glass feeder for feeding charges to suitable molds, said feeder comprising adjustable mechanism to regulate the size of charges fed; molds to receive the charges; means to press the charges in the molds; non-reversible motor mechanism for adjusting the adjustable mechanism to increase the size of the charges fed; non-reversible motor mechanism for adjusting the adjustable mechanism to decrease the size of charges fed; means to actuate said first motor mechanism when the pressed charge is too small and to actuate said second motor mechanism when the pressed charge is too large.

13. In combination; a glass feeder for feeding mold charges to suitable molds, said feeder comprising adjustable mechanism to regulate the size of charges fed; molds to receive the charges; means to press the charges in the molds; control means positioned in accordance with the volume of glass molded; non-reversible motor mechanism for adjusting the adjustable mechanism to vary the size of charges fed; and means connecting said control means and said motor mechanism to adjust said adjustable mechanism in response to the positioning of said control means.

14. In combination; a glass feeder for feeding mold charges to suitable molds, said feeder comprising adjustable mechanism to regulate the size of charges fed; molds to receive the charges; means to press the charges in the molds; controlling means positioned in accordance with the volume of glass molded; and means cooperating with said controlling means and said glass feeder to adjust said adjustable mechanism if the volume of glass molded varies for predetermined limits, said cooperating means being inoperative if the volume molded is within said predetermined limits.

15. The method of maintaining uniformity in the volumes of glass charges fed to molds, which method comprises measuring the volume of a charge and causing the variation of said measurement from a predetermined standard automatically to control the volume of a series of consecutive charges.

16. The method of maintaining uniformity in the volumes of glass charges fed to molds, which method comprises measuring the volume of a charge and causing the variation of said measurement from a predetermined standard to regulate the volume of each of a series of consecutive charges in accordance with said standard charge.

17. The method of correcting for irregularities in the rate of flow of glass charges due to temperature changes and the like, which method comprises causing a predetermined variation in the volume of a charge from a standard volume to change the volume of each of a series of consecutive charges a predetermined amount.

18. The method of correcting for irregularities in the rate of flow of glass charges due to temperature changes and the like, which method comprises causing the variation in the volume of a charge from a predetermined standard to change the period of flow for each of a series of consecutive charges.

19. The method of maintaining uniformity in the charges of glass produced by an automatic feeder supplying charges to a fabricating machine, which method comprises measuring the volume of a charge being fabricated and causing a predetermined variation of said measurement from a standard measurement to change the volume of each of a series of consecutive charges.

20. The method of controlling glass mold charges fed by automatic glass feeding machines, which method comprises measuring the volume of a charge in a mold during a pressing operation, and causing the variation in the said measurement from a predetermined standard to operate the feeder control for effecting a permanent adjustment thereof to correct automatically each of a series of consecutive charges.

21. The combination of a glass feeder adapted to feed mold charges to suitable molds, a control mechanism for said feeder whereby the volume of charges may be controlled, molds for receiving the said charges, means to press the charges in the molds, devices for measuring the variation of the press charge from a standard charge, and means for automatically operating the controls to increase or decrease the volume of each of a series of consecutive charges delivered by the feeder, if the variation of the press charge exceeds a predetermined amount.

22. The combination of an automatic glass feeder adapted to feed mold charges to suitable molds, an automatic regulator for said feeder, said regulator comprising mechanism for pressing a charge fed and means for controlling each of a series of consecutive charges in response to the variation in the volume of a press charge from the volume of a standard charge.

23. The method of controlling the feeding of glass charges to molds, which method comprises measuring the volume of the charge fed, and causing a predetermined variation of the measured volume from a standard volume to regulate the volume of a series of consecutive charges.

PETER KUCERA.